2,780,531

HYDRAZINE RECOVERY

Richard N. Lewis, North Haven, Conn., assignor to Olin Mathieson Chemical Corporation, a corporation of Virginia No Drawing. Application February 23, 1954, Serial No. 412,051

8 Claims. (Cl. 23—312)

This invention relates generally to hydrazine and more particularly to a novel and improved method for dehydrating aqueous solutions of hydrazine.

Hydrazine and water form a constant-boiling mixture and, consequently, about 64 to 70 percent hydrazine is the maximum concentration that can be obtained as a residue from ordinary fractional distillation processes which involve vaporizing the water. It has been suggested that barium oxide, calcium oxide or sodium hydroxide be included in the distillant of such processes if more concentrated solutions are desired but fractional distillation processes require a high heat consumption to vaporize the water and only large and intricately designed fractionating columns equipped with apparatus for operation under vacuum can be utilized. On the other hand, the proposed method for separating hydrazine from water by converting it to hydrazine sulfate and treating this product with liquid ammonia requires a complexity of equipment and has a high cost of raw materials. Moreover, by-products which are difficult to separate from hydrazine are produced in such a process.

It is, therefore, an object of this invention to provide a novel and improved method for separating hydrazine from water. Another object is to provide a more economical method for concentrating aqueous solutions of hydrazine. Still another object is to provide a method for removing hydrazine from an aqueous solution and thereafter recovering the hydrazine as substantially anhydrous hydrazine.

In accordance with this invention, the foregoing objects as well as others are accomplished, generally speaking, by providing a method for preparing hydrazine which involves extracting hydrazine from an aqueous solution thereof with an organic acid having an ionization constant of not more than that of hydroxybenzene and thereafter decanting the acid phase from the aqueous phase. The hydrazine is then separated from the organic acid phase by various techniques. Among these techniques a straight distillation of the acid phase appears to be the most preferred. However, one may also enjoy a precipitation technique which involves the adding of an acid capable of precipitating hydrazine, such as hydrochloric, sulfuric, etc. to the acid phase and then filtering off the precipitate. The hydrazine is then regenerated with the use of a base such as ammonia or solid alkali hydroxide. This latter technique using the decantation as a preliminary step is an improvement over the precipitation teachings of the prior art in that a better precipitation results. This follows from the fact that more concentrated solutions give better precipitations. Another technique that suggests itself is the addition of an alcohol to the phenol solution and subsequent distillation such as disclosed in copending application, Serial Number 384,513, filed October 6, 1953.

Obviously, the extraction technique of this invention will be more effective if more than one extraction is used. In this regard, spray towers, pack towers, baffle towers, perforated plate towers, as described in the book entitled "Liquid Extraction," by Robert E. Treybal, McGraw-Hill Book Company, Inc., New York, 1951, may be used. A continuous extraction technique or an economical batch extraction technique will thereby be enabled.

An organic acid having an ionization constant of not more than that of hydroxybenzene, reported to be about $1.3 \times 10^{-10}$ at 25° C. in the Handbook of Chemistry and Physics, twenty-fifth edition, published by Chemical Rubber Publishing Company in July 1941, which does not react chemically with hydrazine and is substantially insoluble in an aqueous solution of hydrazine, can be utilized as the extractor for the hydrazine. Phenols such as hydroxybenzene and its homologs having substituted alkyl groups are excellently suited for selectively dissolving hydrazine from an aqueous solution. The hydrazine in the phenol phase can be easily separated from the phenol by the various separation techniques discussed above. More specifically, hydroxybenzene and its alkyl homologs having alkyl groups of one to eight carbon atoms such as, ortho butyl-hydroxybenzene, para tertiary butyl hydroxybenzene, the di-methyl hydroxybenzene (xylenols), ortho ethyl hydroxybenzene, meta ethylhydroxybenzene, para ethyl hydroxybenzene, ortho propyl hydroxybenzene, meta propyl hydroxybenzene, para propyl hydroxybenzene, meta methyl hydroxybenzene, ortho methyl hydroxybenzene, para methylhydroxybenzene, para amyl hydroxybenzene, para tertiary amyl hydroxybenzene and the octyl hydroxybenzenes are suitable for the purpose. The xylenols and the cresols, singly and combined as well as cresylic acid have been found to be particularly advantageous for extracting the hydrazine from an aqueous solution thereof.

In carrying out the invention in practice, it is preferred to employ a continuous process in which a suitable phenol, or a mixture of phenols is passed through a vertical contact vessel in a flow counter to the flow of the aqueous solution of hydrazine. In order to obtain a large area of contact between the phenol and the aqueous solution, the phenol may be injected through a small orifice into the stream of the aqueous hydrazine solution, or the hydrazine solution may be dispersed in a similar manner into a stream of phenol, as performed when using a spray tower extractor (see Treybal, cited above). The large area of contact between the two phases facilitates absorption of the hydrazine by the phenol. The phenol-hydrazine phase leaving the extraction apparatus is then separated into its components by various techniques, preferably a distillation is used. It is to be understood, however, that other techniques such as precipitation, azeotropic distillation with alcohols, etc., may also be used.

Upon such separation of the hydrazine from the phenol, the phenol may be returned to the extraction column to be utilized again. The volume of solvent required to extract the hydrazine from the aqueous solution is, of course, dependent upon the solubility of the hydrazine in the particular solvent selected from the class of solvents suitable for the purpose. The extraction may be made at room temperature or any other convenient temperature.

It has been found that meta methyl hydroxybenzene and cresylic acid are particularly advantageous for extracting the hydrazine from an aqueous solution thereof. In one example, an aqueous solution composed of about 6% hydrazine and about 94% water was extracted with meta methyl hydroxybenzene in the ratio of about 2 parts thereof to one part aqueous solution. The resulting meta methyl hydroxybenzene phase was separated from the water rich phase and it was found that about 2.7% hydrazine, about 14.2% water and about 83.1% meta methyl hydroxybenzene were in the lower phase. About 3.7% hydrazine, about 2.2% meta methyl hydroxybenzene and about 94.1% water formed the upper phase. It is to be noted that the meta methyl hydroxybenzene phase contained only about 5.2 parts water per part of hydrazine.

An aqueous solution composed of about 94.5% water and about 5.5% hydrazine was extracted with cresylic acid. The cresylic acid utilized was a mixture of phenols boiling from about 202° C. to about 217° C., a commercially available product. About 2 parts cresylic acid was utilized for each part aqueous solution. The resulting cresylic acid rich phase contained about 2.6% hydrazine, about 12.4% water and about 85% cresylic acid. The upper aqueous rich phase contained only about 1% cresylic acid. It is to be noted that less than 5 parts water per part hydrazine was found in the meta methyl hydroxybenzene rich phase. This water could be removed by azeotropic distillation.

In order further to clarify and better to describe the invention, the following is a detailed description of one embodiment thereof:

About 178 parts of an aqueous solution containing about 11 parts hydrazine is mixed with about 170 parts meta methyl hydroxybenzene and the mixture is agitated about 10 minutes at about 20° C. The agitation is discontinued and the two phases are permitted to segregate and are then separated by decantation. The lower phase contains about 5.5 parts hydrazine, about 32 parts water and about 167 parts meta methyl hydroxybenzene. About 5.5 parts of the hydrazine is in the upper phase which also contains about 135 parts water and about 3 parts meta methyl hydroxybenzene. Extraction of the upper phase is repeated with seven successive similar volumes of meta methyl hydroxybenzene to remove substantially all of the hydrazine therefrom and each of the phases rich in meta methyl hydroxybenzene and hydrazine and containing a small amount of water are mixed with the aforesaid lower phase and the resulting solution is separated into its components by techniques known to those skilled in the art, preferably a distillation technique is used. Hydrazine is found to come off as a fraction of the distillate and is found to be either substantially anhydrous or of such concentration that a second distillation of that fraction will yield an anhydrous hydrazine. The meta methyl hydroxybenzene is recycled for a succeeding extraction process.

The foregoing embodiment is described in detail in order to illustrate the invention but variations will occur to those skilled in the art and can be made without departing from the spirit and scope of the invention except as limited by the appended claims.

The invention having thus been described, what is claimed and desired to be secured by Letters Patent is as follows:

1. An extraction process for dehydrating aqueous hydrazine which comprises mixing an organic acid having an ionization constant of not more than $1.3 \times 10^{-10}$ at 25° C. with the aqueous hydrazine mixture and decanting a hydrazine-acid layer from the aqueous mixture.

2. An extraction process for dehydrating aqueous hydrazine which comprises mixing an organic acid having an ionization constant of not more than that of hydroxybenzene with the aqueous hydrazine mixture and decanting a hydrazine-acid layer from the aqueous mixture.

3. An extraction process for dehydrating aqueous hydrazine which comprises mixing an organic acid having an ionization constant of not more than that of hydroxybenzene and thereafter separating the hydrazine and the organic acid with the aqueous hydrazine mixture and decanting a hydrazine-acid layer from the aqueous mixture.

4. An extraction process for dehydrating aqueous hydrazine which comprises mixing a phenolic compound with the aqueous hydrazine mixture and decanting a hydrazine-phenol layer from the aqueous mixture.

5. An extraction process for dehydrating aqueous hydrazine which comprises mixing a phenolic compound with the aqueous hydrazine mixture and decanting a hydrazine-phenol layer from the aqueous mixture and thereafter separating the hydrazine and the phenolic compound.

6. An extraction process for dehydrating aqueous hydrazine which comprises mixing metamethyl hydroxybenzene with the aqueous hydrazine mixture and decanting a hydrazine-meta-methyl hydroxybenzene layer from the aqueous mixture.

7. An extraction process for dehydrating aqueous hydrazine which comprises mixing cresylic acid with the aqueous hydrazine mixture and decanting a hydrazine-cresylic acid layer from the aqueous mixture.

8. A continuous extraction process for dehydrating aqueous hydrazine which comprises continuously adding an organic acid having an ionization constant of not more than $1.3 \times 10^{-10}$ at 25° C. to the aqueous hydrazine mixture in a continuous countercurrent extractor continuously decanting hydrazine-acid layers from aqueous layers to effect an extraction of the hydrazine from the aqueous layer and thereafter separating the hydrazine from the organic acid and recycling the organic acid to the extractor.

References Cited in the file of this patent

Audreith and Ogg: "The Chemistry of Hydrazine," pages 203 and 50. Wiley and Sons, Inc., 1951, New York, N. Y.